F. P. MAIZE.
AUTO PEDALS LOCK.
APPLICATION FILED NOV. 4, 1919.

1,346,098.

Patented July 6, 1920.

Inventor:
Frank P. Maize
by J. J. Geisler
atty.

UNITED STATES PATENT OFFICE.

FRANK P. MAIZE, OF PORTLAND, OREGON.

AUTO-PEDALS LOCK.

1,346,098. Specification of Letters Patent. Patented July 6, 1920.

Application filed November 4, 1919. Serial No. 335,773.

*To all whom it may concern:*

Be it known that I, FRANK P. MAIZE, a citizen of the United States, and resident of Portland, county of Multnomah, and State of Oregon, have invented a new and useful Improvement in Auto-Pedals Locks, of which the following is a specification.

My invention has for its object the providing of a simple and efficient lock to be applied to the clutch and the reverse pedals of an automobile for rendering them inoperative.

It is further my object to make my lock a device which may be readily applied, and can be manufactured at reasonable cost.

A further object of my invention is to make my lock adjustable relatively to the length of the shank of the clutch lever, that being the most important of the control member of the engine to be rendered inoperative.

It is also my object to have my lock serve as means for preventing tampering with the clutch pedal, by getting access through the floor of the dash board. Since this floor is usually made in pieces laid across the frame of the chassis, my invention is adapted to lock these pieces in place so that they can not readily be raised or moved out of place while my lock is applied.

I attain the objects of my invention and incidental features by the device illustrated in the accompanying drawings in which.

$s$ and $t$ represent the floor pieces of the dash end, and $u$ the slots therein for the pedals to operate in. $v$ is the clutch pedal, $w$ the reverse pedal and $x$ the brake-pedal.

Figure 4:
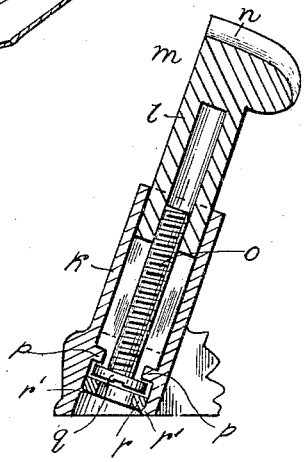
Fig. 4 is a sectional detail of construction fully described in the body of the specification.
Figure 3:
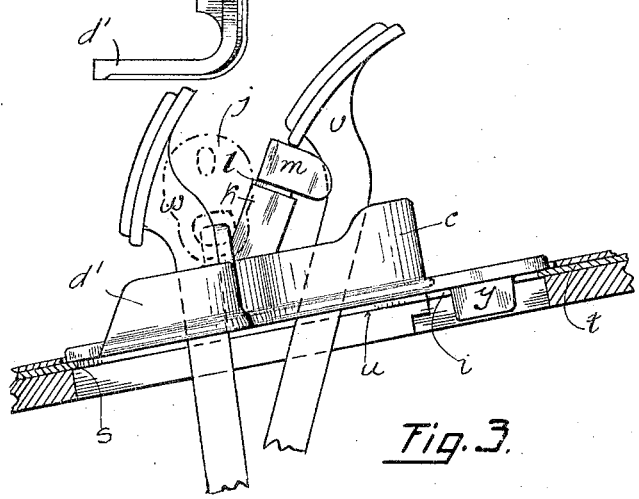
Fig. 3 is a side elevation of my lock.

My lock consists of a base or main-piece $a$ being a casting having an integral, perpendicular flange $b$ comprising a section $c$, and a section $d$ which are shaped to embrace one side of the clutch-pedal and of the reverse pedal. To the flange $b$ is hinged a movable piece or strap $e$ which is shaped to embrace the other or far side of the clutch pedal and the reverse pedal; the strap comprising an angular part $f$ which, when my lock is arranged in its closed state, will abut with the section $d$ of the flange $b$ of the main piece. The part $f$ of the strap $e$ is made with an angular part $g$ being a companion part of the portion $d'$ of the flange $b$. The section $d$ of the flange $b$ is made with an ear $h$, and the part $f$ of the strap $e$ is made with a companion ear $i$ through which ears the shackle of a padlock $j$ is inserted. The strap $e$ is formed with an integral socket $k$ in which is slidably mounted a leg or strut $l$, made with a head $m$ which is preferably provided with a groove $n$, to provide a seat for the head of the clutch pedal. The leg $l$ is made with a screw-post $o$ for the purpose of adjusting its length relatively to the length of the shank of the clutch pedal $v$. In order to hold the screw-post $o$ rotatably in place, the socket $k$ may be formed with an interior flange $p$ and the screw-post $o$ made with a head $q$; and a disk $r$ is inserted at the open end of the socket $k$, and secured in place by upsetting the rim of the socket as shown at $r'$ in Fig. 4.

Figure 1:
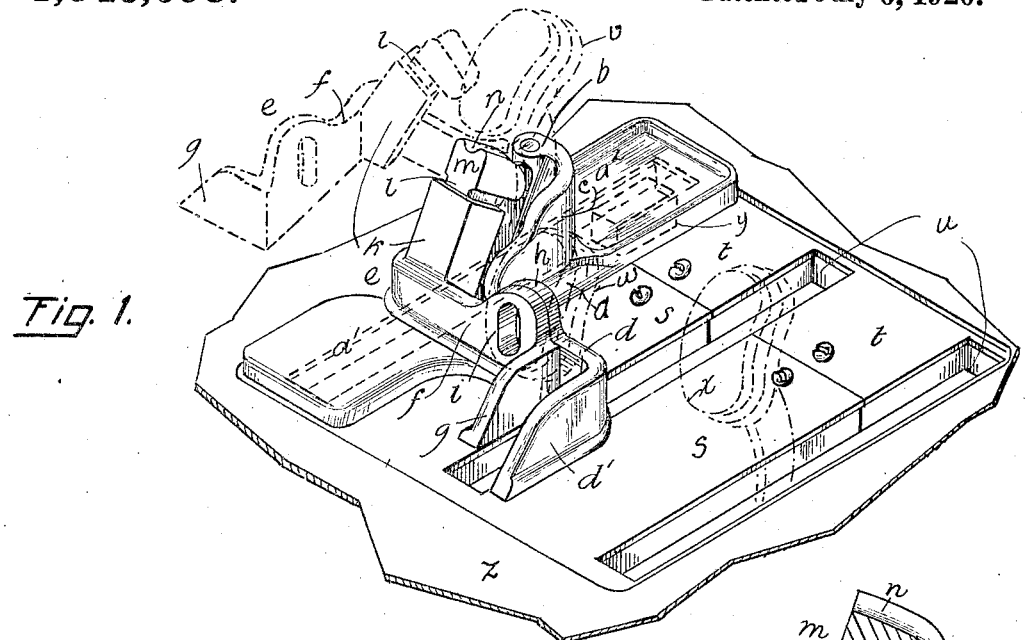
Figure 1 is a perspective showing portions of the flooring of the dash end of the automobile with my lock applied as in practice for locking the clutch pedal and the reverse pedal against movement in either direction, said pedals being shown in broken outline.
Figure 2:
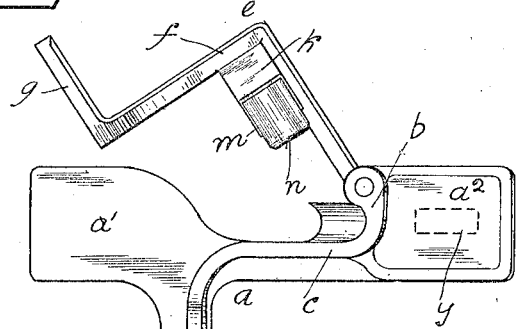
Fig. 2 is a top view of my lock with its movable part placed in its open position.

The practical application of my lock is observable from Figs. 1 and 2. The flange $b$ and strap $e$, embrace the sides of the shank of the clutch pedal $cl.$, and the reverse pedal $rp$.

In order to prevent access being obtained through the floor of the dash-end for tampering with the levers of the engine, the base or main portion of my lock is made with laterally projecting portions $a'$ and $a^2$, adapted for covering the floor-pieces $s$ and $t$, and preventing their being lifted. Furthermore the underside of the lateral projection $a^2$ is made with a lug $y$ fitting the adjacent slot $u$, and preventing the floor-piece $t$ being slid sidewise out of the way.

$z$ represents the usual mat on the floor of the dash-end.

In order to apply my lock, the clutch-pedal must first be brought to its neutral position, then the flange $b$ of my lock prevents the forward movement of this pedal and the leg $l$ its backward movement; hence the clutch pedal is inoperative. The reverse pedal is likewise held in inoperative position by the portions $d$, $d'$ and $g$ of my lock.

I claim:

1. In an auto lock, the combination of a base provided with a lug adapted to be inserted in the slot provided for the clutch pedal in the dash floor plate, said base having laterally projecting portions for the purpose specified, a flange-abutment on the base adapted for embracing one side of the shank of the clutch-pedal, a strap hinged to said flange-abutment adapted for embracing the opposite side of said clutch-pedal, one of the parts being provided with a leg having its head-end adapted for bearing against the head of the clutch-pedal when the latter is in its neutral position, and means for locking the strap in its closed position.

2. In an auto lock, the combination of a base provided with a lug adapted to be inserted in the slot provided for the clutch pedal in the dash floor plate, said base having laterally projecting portions for the purpose specified, a flange-abutment on the base adapted for embracing one side of the shank of the clutch-pedal and the shank of the reverse-pedal, a strap hinged to said flange-abutment for embracing the opposite side of said clutch-pedal and the reverse-pedal, one of the parts being provided with a leg having its head-end adapted for bearing against the head of the clutch-pedal when the latter is in its neutral position, and means for locking the strap in its closed position.

3. In an auto lock, the combination of a base provided with a lug adapted to be inserted in the slot provided for the clutch pedal in the dash floor plate, said base having laterally projecting portions for the purpose specified, a flange-abutment on the base adapted for embracing one side of the shank of the clutch-pedal, a strap hinged to said flange-abutment adapted for embracing the opposite side of said clutch-pedal, one of the parts being provided with a leg adjustable as to length having its head-end adapted for bearing against the head of the clutch-pedal when the latter is in its neutral position, and means for locking the strap in its closed position.

4. In an auto lock, the combination of a base provided with a lug adapted to be inserted in the slot provided for the clutch pedal in the dash floor plate, said base having laterally projecting portions for the purpose specified, a flange-abutment on the base adapted for embracing one side of the shank of the clutch-pedal and the shank of the reverse-pedal, a strap hinged to said flange-abutment adapted for embracing the opposite side of said clutch-pedal and the reverse pedal, one of the parts being provided with a leg adjustable as to length having its head-end adapted for bearing against the head of the clutch-pedal when the latter is in its neutral position, and means for locking the strap in its closed position.

5. In an auto lock, the combination of a base provided with a lug adapted to be inserted in the slot provided for the clutch pedal in the dash floor plate, said base having laterally projecting portions for the purpose specified, a flange-abutment on the base adapted for embracing one side of the shank of the clutch-pedal, a strap hinged to said flange-abutment adapted for embracing the opposite side of said clutch-pedal, one of said parts being provided with a socket, a leg slidable therein and provided with an adjustable post, and means for locking the strap in its closed position.

6. In an auto lock, the combination of a base provided with a lug adapted to be inserted in the slot provided for the clutch pedal in the dash floor plate, said base having laterally projecting portions for the purpose specified, a flange-abutment on the base adapted for embracing one side of the shank of the clutch-pedal and the shank of the reverse-pedal, a strap hinged to said flange-abutment adapted for embracing the opposite side of said clutch-pedal and the reverse-pedal, one of the parts being provided with a leg having its head-end adapted for bearing against the head of the clutch-pedal when the latter is in its neutral position, and said flange of the base and said strap being respectively provided with ears for the insertion of the shackle of the padlock.

7. In an auto lock, the combination of a base provided with a lug adapted to be inserted in the slot provided for the clutch pedal in the dash floor plate, said base having laterally projecting portions for the purpose specified, a flange-abutment on the base adapted for embracing one side of the shank of the clutch-pedal and the shank of the reverse-pedal, a strap hinged to said flange-abutment adapted for embracing the opposite side of said clutch-pedal and the reverse pedal, a screw-post threaded in the leg, such post adapted for rotation by an instrument, means for rotatably securing the post in place, and means for locking the strap in its closed position.

8. In an auto lock, the combination of a base provided with a lug adapted to be inserted in the slot provided for the clutch-pedal in the dash floor plate, a flange-abutment on the base adapted for embracing one side of the shank of the clutch-pedal, a strap hinged to said flange-abutment adapted for embracing the opposite side of said clutch-pedal, one of the parts being provided with a leg having its head-end adapted for bearing against the head of the clutch-pedal when the latter is in its neutral position, and means for locking the strap in its closed position.

9. In an auto lock, the combination of a base provided with a lug adapted to be inserted in the slot provided for the clutch-pedal in the dash floor plate, a flange-abutment on the base adapted for embracing one side of the shank of the clutch-pedal and the shank of the reverse-pedal, a strap hinged to said flange-abutment adapted for embracing the opposite side of said clutch-pedal and the reverse pedal, one of the parts being provided with a leg adjustable as to length having its head-end adapted for bearing against the head of the clutch-pedal when the latter is in its neutral position, and means for locking the strap in its closed position.

FRANK P. MAIZE.